US 11,488,734 B2

(12) United States Patent
Yan et al.

(10) Patent No.: US 11,488,734 B2
(45) Date of Patent: Nov. 1, 2022

(54) ELECTRICAL PENETRATION ASSEMBLY, MANUFACTURING METHOD THEREOF, AND ELECTRICAL PENETRATION DEVICE

(71) Applicant: Tsinghua University, Beijing (CN)

(72) Inventors: He Yan, Beijing (CN); Xingzhong Diao, Beijing (CN); Zhichun Fan, Beijing (CN); Yong Zhang, Beijing (CN); Haitao Wang, Beijing (CN); Yujie Dong, Beijing (CN); Zuoyi Zhang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 30 days.

(21) Appl. No.: 17/254,552

(22) PCT Filed: Dec. 19, 2018

(86) PCT No.: PCT/CN2018/122019
§ 371 (c)(1),
(2) Date: Dec. 21, 2020

(87) PCT Pub. No.: WO2019/242263
PCT Pub. Date: Dec. 26, 2019

(65) Prior Publication Data
US 2021/0249148 A1 Aug. 12, 2021

(30) Foreign Application Priority Data
Jun. 22, 2018 (CN) .......................... 201810651657.2

(51) Int. Cl.
*G01K 11/3206* (2021.01)
*G21C 17/116* (2006.01)
(Continued)

(52) U.S. Cl.
CPC ........ *G21C 17/116* (2013.01); *G01K 11/3206* (2013.01); *G21C 13/036* (2013.01);
(Continued)

(58) Field of Classification Search
None
See application file for complete search history.

(56) References Cited

U.S. PATENT DOCUMENTS 4,058,671 A * 11/1977 Panek .................. G21C 17/116
174/12 R

FOREIGN PATENT DOCUMENTS

| CN | 202221488 U | 5/2012 |
| CN | 202221489 U | 5/2012 |

(Continued)

OTHER PUBLICATIONS

Fan Zhichun et al., "Stress Monitoring of Sealing Materials in Electrical Penetration Assemblies," 2018, pp. 1-8, ASME.
(Continued)

*Primary Examiner* — Chad H Smith
(74) *Attorney, Agent, or Firm* — Jaffery Watson Mendonsa & Hamilton LLP (57) ABSTRACT

Disclosed are an electrical penetration assembly, a manufacturing method thereof, and an electrical penetration device, which relate to the technical field of electrical penetration. The electrical penetration assembly comprises sealing glass (5), an outer tube (4) and a conductor (7) inserted into the outer tube (4), wherein both ends of the outer tube (4) are blocked by supporting and fixing blocks (8), and both ends of the conductor (7) respectively protrude from the corresponding supporting and fixing blocks (8); the sealing glass (5) is sintered between the conductor (7) and the outer tube (4) and is configured to divide an annular cavity jointly enclosed by the conductor (7), the outer tube
(Continued)

(4) and the supporting and fixing blocks (8) into an upper cavity and a lower cavity; an optical fiber (14) penetrates the sealing glass (5), at least one end of the optical fiber (14) is connected to an optical fiber splice (3) after protruding from the corresponding supporting and fixing block (8), and a portion of the optical fiber (14) located in the sealing glass (5) is inscribed with a fiber Bragg grating to form a first fiber Bragg grating sensor (1). By utilizing the first fiber Bragg grating sensor (1) to monitor the strain and temperature of the sealing glass (5) in real time, not only can it judge whether the electrical penetration assembly meets the requirements for hermeticity, but also enable precise control of the sintering temperature.

9 Claims, 6 Drawing Sheets (51) Int. Cl.
      *G21C 13/036*     (2006.01)
      *H01R 13/52*     (2006.01)
      *G01L 1/24*     (2006.01)
      *H01B 11/22*     (2006.01)
(52) U.S. Cl.
    CPC .......... *H01R 13/5216* (2013.01); *G01L 1/246* (2013.01); *H01B 11/22* (2013.01)

(56) References Cited

FOREIGN PATENT DOCUMENTS

| | | | | |
|---|---|---|---|---|
| CN | 202939981 U | 5/2013 | | |
| CN | 103708728 A | 4/2014 | | |
| CN | 105845186 A | 8/2016 | | |
| CN | 107817061 A | 3/2018 | | |
| CN | 107851467 A | 3/2018 | | |
| CN | 108831571 A | 11/2018 | | |
| GB | 958439 A1 | * | 5/1964 | ........... G21C 17/116 |
| JP | 2007209102 A | 8/2007 | | |
| WO | WO-0033034 A1 | * | 6/2000 | ......... G01D 5/35316 |

OTHER PUBLICATIONS

International Search Report, PCT Application No. PCT/CN2018/122019, dated Mar. 25, 2019, pp. 1-5, CNIPA.
Li Mingze et al., "Prestress Measurement During Glass-Metal Sealing Based on a Fiber Sensor," 2018, pp. 664-670, English Abstract (1-page), China Academic Journal Electronic Publishing House.
Li Mingze et al., "Residual Stress Measurement of Sealing Glass Based on Optical Fiber Sensing Technology," 2018, pp. 1-6, ASME.
Zhichun Fan et al., "Analysis of Residual Stress in Electrical Penetration Assembly Based on a Fiber Bragg Grating Sensor," Jan. 2019, pp. 1-12, vol. 19, Issue 1, MDPI.

* cited by examiner

ELECTRICAL PENETRATION ASSEMBLY, MANUFACTURING METHOD THEREOF, AND ELECTRICAL PENETRATION DEVICE

CROSS-REFERENCE TO RELATED APPLICATION

The present application claims priority under 35 U.S.C. § 371 to International patent application No. PCT/CN2018/122019 filed on Dec. 19, 2018, entitled "ELECTRICAL PENETRATION ASSEMBLY, MANUFACTURING METHOD THEREOF, AND ELECTRICAL PENETRATION DEVICE", which claims priority to Chinese Application No. 2018106516572 filed on Jun. 22, 2018, entitled "Electrical Penetration Assembly, Manufacturing Method Thereof, and Electrical Penetration Device," which is hereby incorporated by reference in its entirety.

FIELD OF TECHNOLOGY

The present disclosure relates to the technical field of electrical penetration, and more particularly, to an electrical penetration assembly, a manufacturing method thereof, and an electrical penetration device.

BACKGROUND

As nuclear safety class 1E equipment, electrical penetration assemblies not only ensure the complete hermeticity of the reactor pressure boundary or cabin boundary, but also enable the transmission of electrical or optical signals.

At present, the electrical penetration assembly is generally composed of an outer metal shell, a metal conductor, and a sealing material. According to different sealing materials, electrical penetration assemblies are usually divided into metal-to-organic sealed electrical penetration assemblies, metal-to-ceramic sealed electrical penetration assemblies, and metal-to-glass sealed electrical penetration assemblies. Among them, metal-to-glass sealed electrical penetration assemblies have the advantages of high pressure and temperature resistance compared with metal-to-organic sealed electrical penetration assemblies, and the low sintering temperature and simple manufacturing process compared with ceramic penetration assemblies.

However, electrical penetration assemblies are usually in a high-temperature and high-pressure working environment, for example, the electrical penetration assemblies installed on the pressure vessel of high temperature gas-cooled reactor are subjected to 150° C. and 7 MPa for a long time, thus strains exceeding the threshold are prone to occur in the sealing material of the electrical penetration assemblies, and such excessive strain will cause defects or cracks, which will directly lead to the failure of the electrical penetration assemblies.

SUMMARY

An objective of the present disclosure is to provide an electrical penetration assembly, a manufacturing method thereof, and an electrical penetration device, so as to monitor the strain of the sealing glass in real time and prevent the electrical penetration assembly from failing due to excessive strain of the sealing glass.

In an embodiment, the present disclosure provides an electrical penetration assembly, including sealing glass, an outer tube and a conductor inserted into the outer tube, wherein both ends of the outer tube are blocked by supporting and fixing blocks, and both ends of the conductor respectively protrude from the corresponding supporting and fixing blocks; the sealing glass is sintered between the conductor and the outer tube and is configured to divide an annular cavity jointly enclosed by the conductor, the outer tube and the supporting and fixing blocks into an upper cavity and a lower cavity; an optical fiber penetrates the sealing glass, at least one end of the optical fiber is connected to an optical fiber splice after protruding from the corresponding supporting and fixing block, and a portion of the optical fiber located in the sealing glass is inscribed with a fiber Bragg grating to form a first fiber Bragg grating sensor.

In an embodiment, both an upper portion and a lower portion of the outer tube are provided with vent holes transversely running therethrough.

In an embodiment, a plurality of the optical fibers penetrate the sealing glass.

In an embodiment, the conductor includes a metal conductor and an insulating sleeve sleeved on an outer side of the metal conductor.

In an embodiment, the sealing glass is made of inorganic materials.

In an embodiment, a portion of the optical fiber proximate to the sealing glass is inscribed with a fiber Bragg grating to form a second fiber Bragg grating sensor.

In an embodiment, the second fiber Bragg grating sensor is provided in the optical fiber located on both upper and lower sides of the sealing glass.

In an embodiment, the present disclosure further provides a manufacturing method of an electrical penetration assembly, including the following steps:

placing glass powder into a mold and press-forming to obtain a formed blank;

drilling a first through hole into which a conductor is inserted and a second through hole through which an optical fiber penetrates on the formed blank to obtain a processed blank;

putting the processed blank into a heating furnace and heating at a low temperature until the processed blank is vitrified into sealing glass;

pushing the sealing glass into an outer tube by means of a support mold; wherein the support mold is provided with a first jack and a second jack coaxially with the first through hole and the second through hole, respectively;

inserting the conductor and the optical fiber into the first through hole and the second through hole respectively, and locating a first fiber Bragg grating sensor on the optical fiber into the second through hole to obtain an assembled sample;

putting the assembled sample into a heating furnace and heating at a high temperature until the sealing glass reaches a target temperature and is molten, and stopping heating; and keeping the temperature of the assembled sample for a specified time and cooling to room temperature.

In an embodiment, the putting the assembled sample into a heating furnace and heating at a high temperature until the sealing glass reaches a target temperature specifically includes:

putting the assembled sample into a heating furnace;

installing an optical fiber splice at one end of the optical fiber and connecting the optical fiber splice with an optical signal demodulator;

starting the heating furnace and the optical signal demodulator;

obtaining a wavelength shift $\Delta\lambda$ of the first fiber Bragg grating sensor, and calculating an actual temperature T of the sealing glass by the following equation:

$$\text{equation} \frac{\Delta \lambda}{\lambda_B} = (\alpha + \xi) * (T - T_0);$$

where $\Delta \lambda$ represents the wavelength shift of the first fiber Bragg grating sensor, $\lambda_B$ represents an initial wavelength of the first fiber Bragg grating sensor, $\alpha$ represents a coefficient of thermal expansion of the optical fiber, $\xi$ represents a thermo-optical coefficient of the optical fiber, and $T_0$ represents an initial temperature of the sealing glass; and determining whether the actual temperature of the sealing glass reaches the target temperature or not; if the actual temperature of the sealing glass reaches the target temperature, the heating furnace stops heating, if the actual temperature of the sealing glass does not reach the target temperature, the heating furnace continues heating.

In order to achieve the objective above, the present disclosure further provides an electrical penetration device, including a flange, a locking nut, a holddown ferrule, a mounting sleeve, and at least one electrical penetration assembly mentioned above; an inner wall of a top end of the mounting sleeve is provided with a sealing ring groove, and an outer wall of a bottom end of the mounting sleeve is provided with an external thread; the flange is provided with a mounting through hole an upper part of which has an internal thread matched with the external thread, and the outer tube is inserted in the mounting sleeve; the holddown ferrule is sleeved on the outer tube, a bottom end of the holddown ferrule is inserted in the sealing ring groove, and a top end of the holddown ferrule protrudes from the mounting sleeve; the locking nut is threadedly connected with a top of the mounting sleeve and holds down the holddown ferrule.

The electrical penetration assembly of the present disclosure is simple in structure and easy to install. The strain and temperature of the sealing glass can be monitored in real time through the wavelength shift of the first fiber Bragg grating sensor by means of disposing the first fiber Bragg grating sensor on the optical fiber, that is, inscribing the fiber Bragg grating on the portion of the optical fiber located in the sealing glass, so that not only can the strain of the sealing glass be used to determine whether the electrical penetration assemblies meet the hermeticity requirements or not, and then the electrical penetration assemblies can be repaired and replaced in time, but also the temperature of the sealing glass can be used to accurately control the sintering temperature to ensure that the fiber optic sensor and the sealing glass are fully integrated during sintering to significantly improve the quality of the electrical penetration assemblies. In addition, by penetrating the conductor and the optical fiber on the sealing glass, the electrical penetration assembly can not only use the conductor to realize the transmission of electrical signals, but also use the optical fiber to realize the transmission of optical information signals. In addition, the electrical penetration assembly can be used to transmit not only electrical signals using the conductor, but also optical signals using the optical fiber by threading the conductor and the optical fiber through the sealing glass.

REFERENCE NUMERALS

| 1 | first fiber Bragg grating sensor | 2 | second fiber Bragg grating sensor |
|---|---|---|---|
| 3 | optical fiber splice | 4 | outer tube |
| 5 | sealing glass | 6 | second through hole |
| 7 | metal conductor | 8 | supporting and fixing block |
| 9 | holddown ferrule | 10 | locking nut |
| 11 | mounting sleeve | 12 | flange |
| 13 | support mold | 14 | optical fiber |
| 15 | vent hole | 16 | insulating sleeve |
| 17 | junction box | 18 | bolt |
| 19 | cable gland | 20 | FC adapter flange |

DETAILED DESCRIPTION

In order to specify the objectives, technical solutions and advantages of the present disclosure, the technical solutions of the present disclosure will be described clearly in conjunction with the accompanying drawings in the present disclosure. Obviously, the embodiments described below are part of the embodiments of the present disclosure, rather than all of the embodiments. Based on the embodiments in the present disclosure, all other embodiments obtained by those of ordinary skill in the art without creative effort shall fall within the protection scope of the present disclosure.

With respect to the description of the present disclosure, unless otherwise specified, the orientation or positional relationship indicated by the terms such as "upper," "lower," "top" and "bottom" is based on the orientation or positional relationship shown in the drawings, the purpose of which is only to facilitate describing the present disclosure and simplify the description, rather than to indicate or imply that the system or element referred to must have a specific orientation, be constructed and operated in a specific orientation, and therefore cannot be construed as a limitation of the present disclosure.

It should be noted that unless otherwise clearly specified or defined, the term "connect" should be understood in a broad sense, for example, it can be a fixed connection or a detachable connection, or an integral connection; it can be directly connected or indirectly connected through an intermediary. For those of ordinary skill in the art, the specific meaning of the above term in the present disclosure can be understood according to the specific situations.

Embodiment 1

Figure 1:
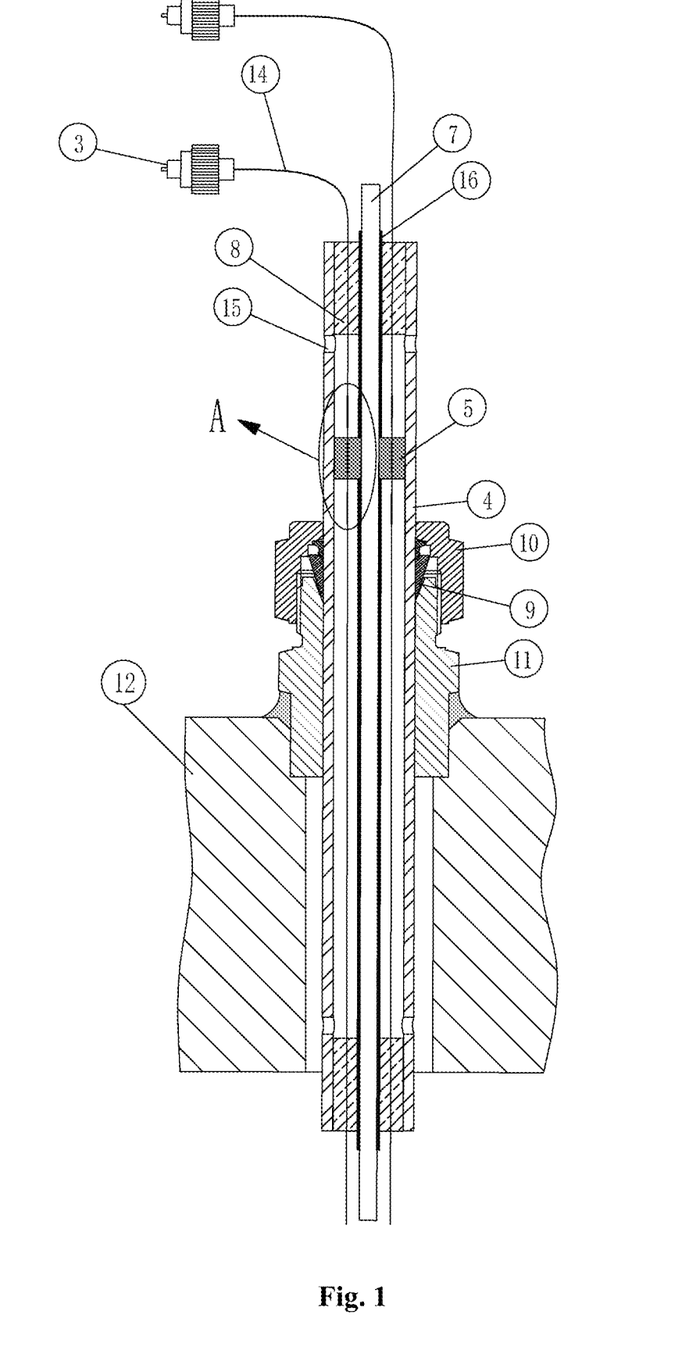
FIG. 1 is a schematic structural diagram of an electrical penetration assembly according to Embodiment 1 of the present disclosure.
Figure 2:
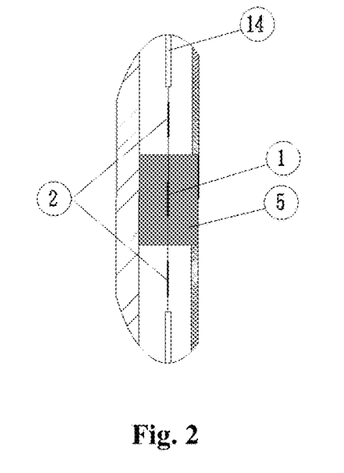
FIG. 2 is an enlarged view of FIG. 1 at A.
Figure 3:
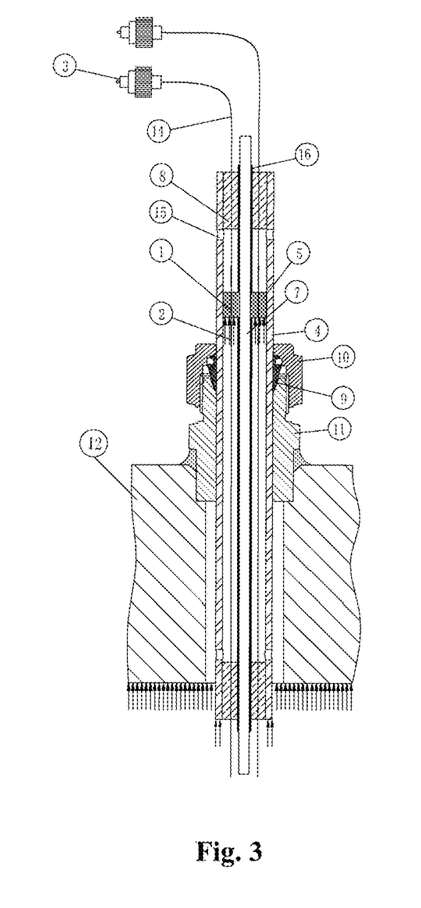
FIG. 3 is a schematic diagram of the force of the electrical penetration assembly when being externally pressurized according to Embodiment 1 of the present disclosure.

As shown in FIGS. 1 to 3, the present disclosure provides an electrical penetration assembly including sealing glass 5, an outer tube 4 and a conductor inserted into the outer tube 4, wherein both ends of the outer tube 4 are blocked by supporting and fixing blocks 8, and both ends of the conductor respectively protrude from the corresponding supporting and fixing blocks 8; the sealing glass 5 is sintered between the conductor and the outer tube 4 and is configured to divide an annular cavity jointly enclosed by the conductor, the outer tube 4 and the supporting and fixing blocks 8 into an upper cavity and a lower cavity; an optical fiber 14 penetrates the sealing glass 5, at least one end of the optical fiber 14 is connected to an optical fiber splice 3 after protruding from the corresponding supporting and fixing block 8, and a portion of the optical fiber 14 located in the sealing glass 5 is inscribed with a fiber Bragg grating to form a first fiber Bragg grating sensor.

According to the principle of Bragg grating, the fiber Bragg grating is equivalent to a fiber optic sensor. Therefore, when the temperature or pressure of the environment in which the electrical penetration assembly is located changes, namely the temperature or strain of the sealing glass 5 changes, the wavelength shift of the first fiber Bragg grating sensor 1 located in the sealing glass 5 will change therewith. In other words, a one-to-one correspondence exists between the wavelength shift of the first fiber Bragg grating sensor 1 and the temperature or strain of the sealing glass 5.

Figure 4:
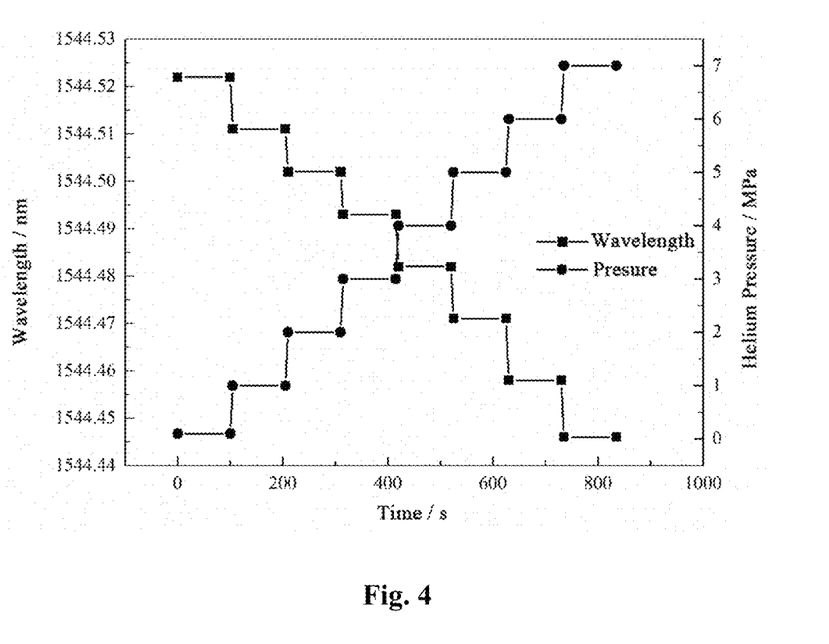
FIG. 4 is a diagram of the characteristic wavelength of a fiber optic sensor as a function of external pressure according to Embodiment 1 of the present disclosure.

For example, as shown in FIG. 4, the characteristic wavelength of the first fiber Bragg grating sensor 1 varies with the external pressure when gas pressure is exerted onto one end of the electrical penetration assembly under a constant temperature environment. That is, a change in external pressure causes a change in the strain inside the sealing glass 5, which in turn causes a change in the wavelength shift of the first fiber Bragg grating sensor 1. Moreover, based on:

$$\frac{\Delta\lambda}{\lambda_B} = (1-P)*\varepsilon; \quad (1)$$

$$\sigma = E*\varepsilon; \quad (2)$$

where $\Delta\lambda$ represents the wavelength shift of the first fiber Bragg grating sensor 1, $\lambda_B$ represents the initial wavelength of the first fiber Bragg grating sensor 1, P represents the elasticity coefficient of the optical fiber 14, $\varepsilon$ represents the strain of the sealing glass 5, and E represents the elasticity modulus of the sealing glass 5. Among the above parameters, the initial wavelength of the first fiber Bragg grating sensor 1, the elasticity coefficient P of the optical fiber 14, and the elasticity modulus E of the sealing glass 5 are available from the reference.

It follows that the wavelength shift $\Delta\lambda$ of the first fiber Bragg grating sensor 1 is an independent variable and the stress $\sigma$ of the sealing glass 5 is a dependent variable according to the above two equations. Thus, given the wavelength shift $\Delta\lambda$ of the first fiber Bragg grating sensor 1, the stress $\sigma$ of the sealing glass 5 can be calculated. Since the wavelength shift $\Delta$ of the first fiber Bragg grating sensor 1 can be directly read from the optical signal demodulator, the wavelength shift $\Delta\lambda$ of the first fiber Bragg grating sensor 1 can be obtained in real time while the electrical penetration assembly is in operation by connecting the optical fiber splice 3 to the optical signal demodulator, and then the stress $\sigma$ of the sealing glass 5 can be calculated. The stress $\sigma$ of the sealing glass 5 not only reflects the external pressure, but can also be used to directly determine whether the electrical penetration assembly meets the hermeticity requirements. Specifically, cracks will occur when the stress $\sigma$ of the sealing glass 5 is greater than or equal to the threshold value, thus it can be determined whether the sealing glass 5 is intact or not based on the stress $\sigma$ of the sealing glass 5, and then the electrical penetration assembly can be repaired or replaced in time.

Figure 5:
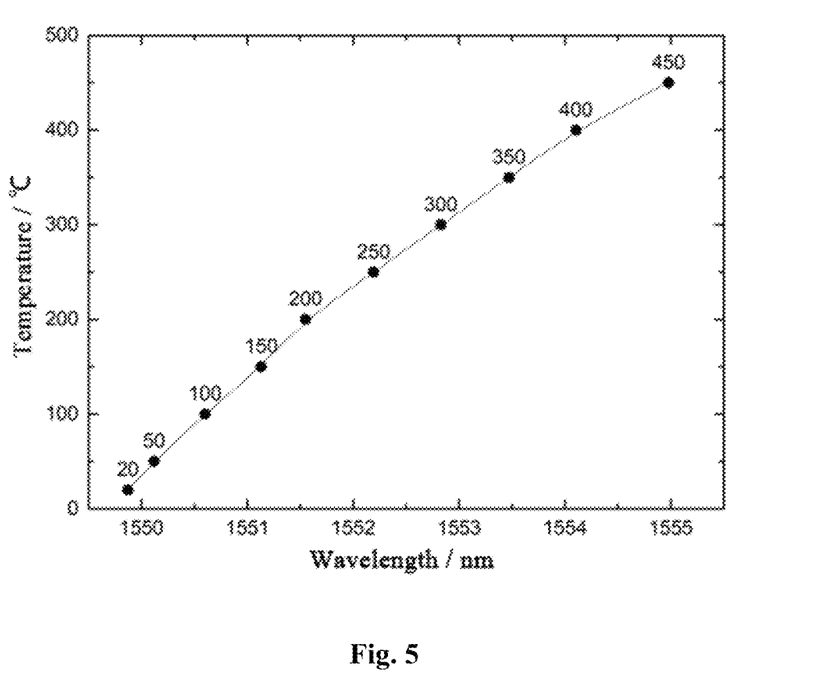
FIG. 5 is a diagram of the characteristic wavelength of a fiber optic sensor as a function of sintering temperature according to Embodiment 1 of the present disclosure.

Similarly, as shown in FIG. 5, the characteristic wavelength of the first fiber Bragg grating sensor 1 varies with the external temperature when the electrical penetration assembly is placed in a variable temperature environment. That is, a change in the external temperature causes a change in the internal temperature of the sealing glass 5, which in turn causes a change in the wavelength shift of the first fiber Bragg grating sensor 1. Moreover, based on:

$$\frac{\Delta\lambda}{\lambda_B} = (\alpha+\xi)*(T-T_0); \quad (3)$$

wherein $\Delta\lambda$ represents the wavelength shift of the first fiber Bragg grating sensor 1, $\lambda_B$ represents the initial wavelength of the first fiber Bragg grating sensor 1, $\alpha$ represents the coefficient of thermal expansion of the optical fiber 14, $\xi$ represents the thermo-optical coefficient of the optical fiber 14, $T_0$ represents the initial temperature of the sealing glass 5, and T represents the actual temperature of the sealing glass 5. Among the above parameters, the initial temperature $T_0$ of the sealing glass 5 is known, and the initial wavelength $\lambda_B$ of the first fiber Bragg grating sensor 1, the coefficient of thermal expansion $\alpha$ of the optical fiber 14 and the thermo-optical coefficient $\xi$ of the optical fiber 14 are available from the reference.

It follows that the wavelength shift $\Delta\lambda$ of the first fiber Bragg grating sensor 1 is an independent variable and the actual temperature T of the sealing glass 5 is a dependent variable according to the above equation. Thus, given the wavelength shift $\Delta\lambda$ of the first fiber Bragg grating sensor 1, the actual temperature T of the sealing glass 5 can be calculated. Since the wavelength shift $\Delta\lambda$ of the first fiber Bragg grating sensor 1 can be directly read from the optical signal demodulator, the wavelength shift $\Delta\lambda$ of the first fiber Bragg grating sensor 1 can be obtained in real time while the electrical penetration assembly is in operation by connecting the optical fiber splice 3 to the optical signal demodulator, and then the actual temperature T of the sealing glass 5 can be calculated. Thus, during the sintering process, the actual temperature T of sealing glass 5 can be monitored by obtaining the wavelength shift $\Delta\lambda$ of the first fiber Bragg grating sensor 1 in real time, which precisely control the sintering temperature. Furthermore, not only the boiling of the sealing glass 5 due to excessively high temperature, but also the insufficient melting of the sealing glass 5 due to insufficient temperature can be avoided, thereby ensuring that the optical fiber 14, the conductor, the outer tube 4 and the sealing glass 5 are fully integrated.

It should be noted that, in order to further improve the degree of integration between the optical fiber 14 and the sealing glass 5 during sintering, the portion of the optical fiber 14 located in the sealing glass 5 is stripped of the coating, that is, the quartz cladding of this part of the optical fiber 14 is exposed to outside and in direct contact with the sealing glass 5.

From the above, the electrical penetration assembly is simple in structure and easy to install. The strain and temperature of the sealing glass 5 can be monitored in real time through the wavelength shift of the first fiber Bragg grating sensor 1 by means of disposing the first fiber Bragg grating sensor 1 on the optical fiber 14, that is, inscribing the fiber Bragg grating on the portion of the optical fiber 14 located in the sealing glass 5, so that not only can the strain of the sealing glass 5 be used to determine whether the electrical penetration assemblies meet the hermeticity requirements, and then the electrical penetration assemblies can be repaired and replaced in time, but also the temperature of the sealing glass 5 can be used to accurately control the sintering temperature to ensure that the optical fiber 14, the conductor, the outer tube 4 and the sealing glass 5 are fully integrated during sintering to significantly improve the quality of the electrical penetration assemblies.

Further, considering that the strain of the sealing glass 5 is affected by temperature in a variable temperature environment, in order to improve the calculation accuracy of the strain of the sealing glass 5, a portion of the optical fiber 14 proximate to the sealing glass 5 is inscribed with a fiber Bragg grating to form a second fiber Bragg grating sensor 2. That is, the portion of the fiber 14 located on the upper and/or lower side of the sealing glass 5 is inscribed with a fiber Bragg grating. Similarly, according to the principle of Bragg grating, this part of fiber Bragg grating is also equivalent to a fiber optic sensor.

Thus, when pressure is exerted onto the electrical penetration in a variable temperature environment, the first fiber Bragg Grating sensor 1 inside the sealing glass 5 will respond to changes in both the temperature and strain of the sealing glass 5, while the second fiber Bragg Grating sensor 2 outside the sealing glass 5 will respond only to changes in the temperature of the sealing glass 5. Accordingly, when the strain of the sealing glass 5 in a variable temperature environment is calculated: firstly, the temperature of the sealing glass 5 can be monitored in real time by a second fiber Bragg grating sensor 2, that is, the temperature of the sealing glass 5 can be calculated by means of equation (3) and the wavelength shift produced by the second fiber Bragg grating sensor 2 obtained by an optical signal demodulator; wherein Δλ and in equation (3) are replaced with the wavelength shift and initial wavelength of the second fiber Bragg grating sensor 2 respectively; secondly, the actual strain E of the sealing glass 5 can be calculated by combining the following equation.

$$\frac{\Delta\lambda}{\lambda_B} = (1-P)*\varepsilon + (\alpha+\xi)*(T-T_0); \quad (4)$$

wherein Δλ represents the wavelength shift of the fiber optic sensor, $\lambda_B$ represents the initial wavelength of the fiber optic sensor, P represents the elasticity coefficient of the optical fiber 14, ε represents the strain of the sealing glass 5, α represents the coefficient of thermal expansion of the optical fiber 14, ξ represents the thermo-optical coefficient of the optical fiber 14, $T_0$ represents the initial temperature of the sealing glass 5, and T represents the actual temperature of the sealing glass 5. Among the above parameters, the initial wavelength of the fiber optic sensor, the elasticity coefficient P of the optical fiber 14, the coefficient of thermal expansion α of the optical fiber 14, and the thermo-optical coefficient ξ of the optical fiber 14 are available from the reference.

Finally, the actual stress of the sealing glass 5 can be obtained according to Hooke's law, namely equation (2).

In an alternative embodiment, the second fiber Bragg grating sensor 2 is provided in the optical fiber 14 located on both the upper and lower sides of the sealing glass 5.

In an alternative embodiment, both an upper portion and a lower portion of the outer tube 4 are provided with vent holes 15 transversely running therethrough. By providing the vent hole 15, on the one hand, it is ensured that the pressure of the sealing medium acts directly on the sealing glass 5, so that the sealing glass 5, instead of the supporting and fixing block 8, bears the pressure; on the other hand, the operator can directly fill the adhesive into the outer tube 4 through the vent hole 15, and the supporting and fixing blocks 8 can be formed after the adhesive is solidified, so that the conductor and the optical fiber 14 are not easily damaged under the supporting and positioning by the supporting and fixing blocks 8.

In an alternative embodiment, a plurality of the optical fibers 14 penetrate the sealing glass 5. Optionally, the plurality of the optical fibers 14 may be arranged at intervals along the circumferential direction of the sealing glass 5.

In an alternative embodiment, the conductor includes a metal conductor 7 and an insulating sleeve 16 sleeved on an outer side of the metal conductor 7.

In an alternative embodiment, the optical fiber splice 3 can be, but not limited to, an FC splice, as can other types of optical fiber splices 3.

In an alternative embodiment, the sealing glass is made of inorganic materials. This arrangement has advantages that inorganic materials are more resistant to harsh environments such as high temperature, high pressure, and irradiation than organic materials, and their composition is basically the same as that of the optical fibers 14, resulting in better adhesion of inorganic materials to the optical fibers 14. In addition, since the outer tube 4 is usually made of metal, when the sealing glass 5 is made of inorganic material, the sealing temperature of the sealing glass 5 is lower than the melting temperature of the optical fiber 14, the conductor and the outer tube 4.

Embodiment 2

Figure 6:
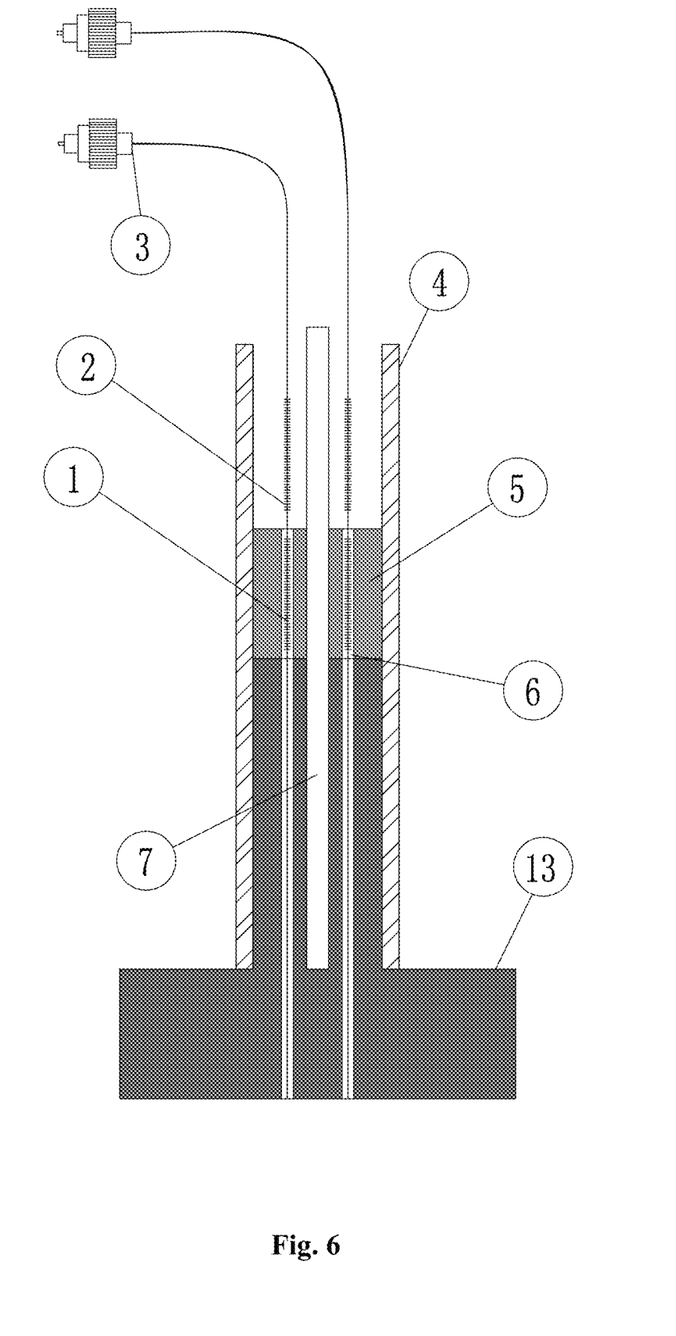
FIG. 6 is a schematic structural diagram of the preparation of the electrical penetration assembly according to Embodiment 2 of the present disclosure.

As shown in FIG. 6, the present disclosure further provides a manufacturing method of an electrical penetration assembly, and the method includes the following steps:

placing glass powder into a mold and press-forming to obtain a formed blank;

drilling a first through hole into which a conductor is inserted and a second through hole 6 through which an optical fiber 14 penetrates on the formed blank to obtain a processed blank; wherein the second through hole 6 can be drilled by a drill having a diameter of 0.45 mm;

putting the processed blank into a heating furnace and heating at a low temperature until the processed blank is vitrified into sealing glass 5;

pushing the sealing glass 5 into an outer tube 4 by means of a support mold 13; wherein the support mold 13 is provided with a first jack and a second jack coaxially with the first through hole and the second through hole 6, respectively;

inserting the conductor and the optical fiber 14 into the first through hole and the second through hole 6 respectively, and locating a first fiber Bragg grating sensor 1 on the optical fiber 14 into the second through hole 6 to obtain an assembled sample;

putting the assembled sample into a heating furnace for heating until the sealing glass 5 reaches a target temperature, and stopping heating; specifically:

putting the assembled sample into a heating furnace;

installing an optical fiber splice 3 at one end of the optical fiber 14 and connecting the optical fiber splice 3 with an optical signal demodulator; wherein the length of the optical fiber 14 can be set according to actual needs, for example, the length of the optical fiber 14 can be set to several meters, or it can be set to several kilometers for the convenience of remote monitoring;

starting the heating furnace and the optical signal demodulator;

obtaining a wavelength shift $\Delta\lambda$ of the first fiber Bragg grating sensor 1, and calculating an actual temperature T of the sealing glass 5 by the following equation:

$$\frac{\Delta\lambda}{\lambda_B} = (\alpha + \xi)*(T - T_0);$$

wherein $\Delta\lambda$ represents the wavelength shift of the first fiber Bragg grating sensor 1, $\lambda_B$ represents an initial wavelength of the first fiber Bragg grating sensor 1, $\alpha$ represents a coefficient of thermal expansion of the optical fiber 14, $\xi$ represents a thermo-optical coefficient of the optical fiber 14, and $T_0$ represents an initial temperature of the sealing glass 5.

Determining whether the actual temperature of the sealing glass 5 reaches the target temperature; when the temperature of the sealing glass 5 rises to the target temperature, the sealing glass 5 just is molten completely; at the same time, the sealing glass 5 and the outer tube 4, the conductor and the optical fiber 14 have been fully integrated. Therefore, when the actual temperature of the sealing glass 5 is greater than the target temperature, the heating furnace stops heating, and the temperature of the assembled sample should be kept for a specified time and then cooled to room temperature; and when the actual temperature of the sealing glass 5 is lower than the target temperature, the heating furnace needs to continue heating until the actual temperature of the sealing glass 5 is equal to the target temperature.

It can be seen that the sintering temperature of the sealing glass 5 can be accurately controlled by providing the first fiber Bragg grating sensor 1 in the sealing glass 5, and using the wavelength shift $\Delta\lambda$ of the first fiber Bragg grating sensor 1 to obtain the actual temperature T of the sealing glass 5, so that not only the boiling of the sealing glass 5 due to excessively high temperature, but also the insufficient melting of the sealing glass 5 due to insufficient temperature can be avoided, thereby ensuring that the optical fiber 14, the conductor, the outer tube 4 and the sealing glass 5 are fully integrated, and significantly improving the quality of the electrical penetration assemblies.

Embodiment 3

Figure 7:
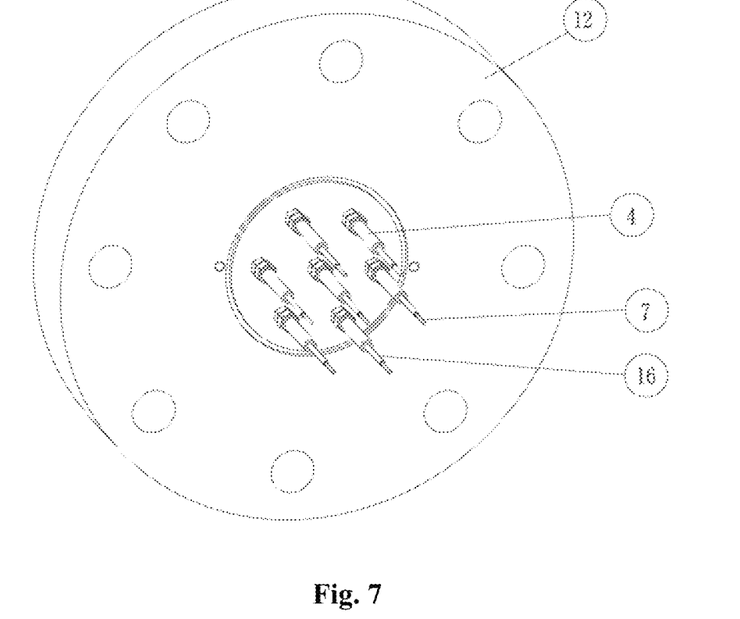
FIG. 7 is an isometric schematic diagram of an electrical penetration device according to Embodiment 3 of the present disclosure.
Figure 8:
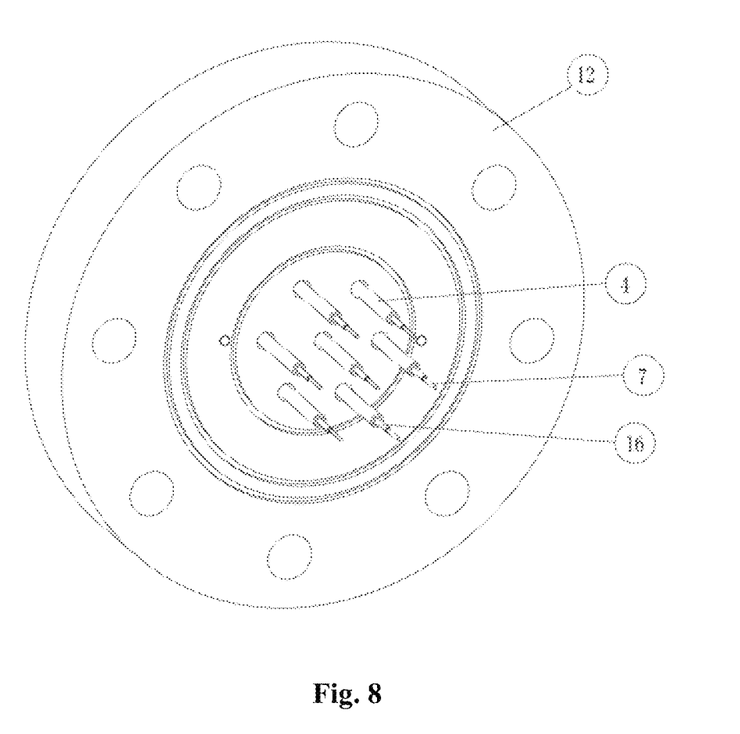
FIG. 8 is an isometric schematic diagram of an electrical penetration device according to Embodiment 3 of the present disclosure.

As shown in FIG. 7 and FIG. 8, the present disclosure further provides an electrical penetration device including a flange 12, a locking nut 10, a holddown ferrule 9, a mounting sleeve 11, and at least one electrical penetration assembly mentioned above; an inner wall of a top end of the mounting sleeve 11 is provided with a sealing ring groove, and an outer wall of a bottom end of the mounting sleeve 11 is provided with an external thread; the flange 12 is provided with a mounting through hole, an upper part of which has an internal thread that is matched with the external thread of the mounting sleeve 11, and the outer tube 4 is inserted in the mounting sleeve 11; the holddown ferrule 9 is sleeved on the outer tube 4, a bottom end of the holddown ferrule 9 is inserted in the sealing ring groove, and a top end of the holddown ferrule 9 protrudes from the mounting sleeve 11; the locking nut 10 is threadedly connected with a top of the mounting sleeve 11 and holds down the holddown ferrule 9. That is, the top of the mounting sleeve 11 is provided with external threads, the inner wall of the locking nut 10 is provided with internal threads that are threadedly connected with the outer threads on the top of the mounting sleeve 11, and an end surface of the locking nut 10 is provided with a through hole through which the outer tube 4 penetrates.

Accordingly, during installation: firstly, the bottom end of the mounting sleeve 11 is screwed into the mounting through hole of the flange 12; then, the outer tube 4 is inserted into the mounting sleeve 11. Specifically, one end of the outer tube 4 passes through the mounting through hole of the mounting sleeve 11 and the flange 12 in turn; then, the holddown ferrule 9 is sleeved on the outer tube 4, and the bottom end of the holddown ferrule 9 is inserted into the sealing ring groove on the top of the mounting sleeve 11. Finally, the locking nut 10 is screwed into the top of the mounting sleeve 11 until the locking nut 10 is pressed against the holddown ferrule 9, at which time the holddown ferrule 9 is fastened to the outer tube 4 and the seal can be provided. It should be noted that, in order to further improve the hermeticity between the mounting sleeve 11 and the flange 12, the gap between the mounting sleeve 11 and the flange 12 can be welded after the bottom end of the mounting sleeve 11 is screwed into the mounting through hole of the flange 12. When the electrical penetration assembly is disassembled and repaired, the holddown ferrule 9 can be taken out after the locking nut 10 is unscrewed by a wrench, and then the electrical penetration assembly can be directly removed from the mounting sleeve 11.

It can be shown that the device is simple in structure and easy to install. The electrical penetration assembly can be independently installed by using the mounting sleeve 11 to fix the electrical penetration assembly on the flange 12, and using the locking nut 10 and the holddown ferrule 9 to detachably insert the electrical penetration assembly on the mounting sleeve 11, and thus it is not only convenient to lately replace and maintain the electrical penetration assembly on the flange plate 12, but also ensuring the sealing performance between the electrical penetration assembly and the flange 12.

Figure 9:
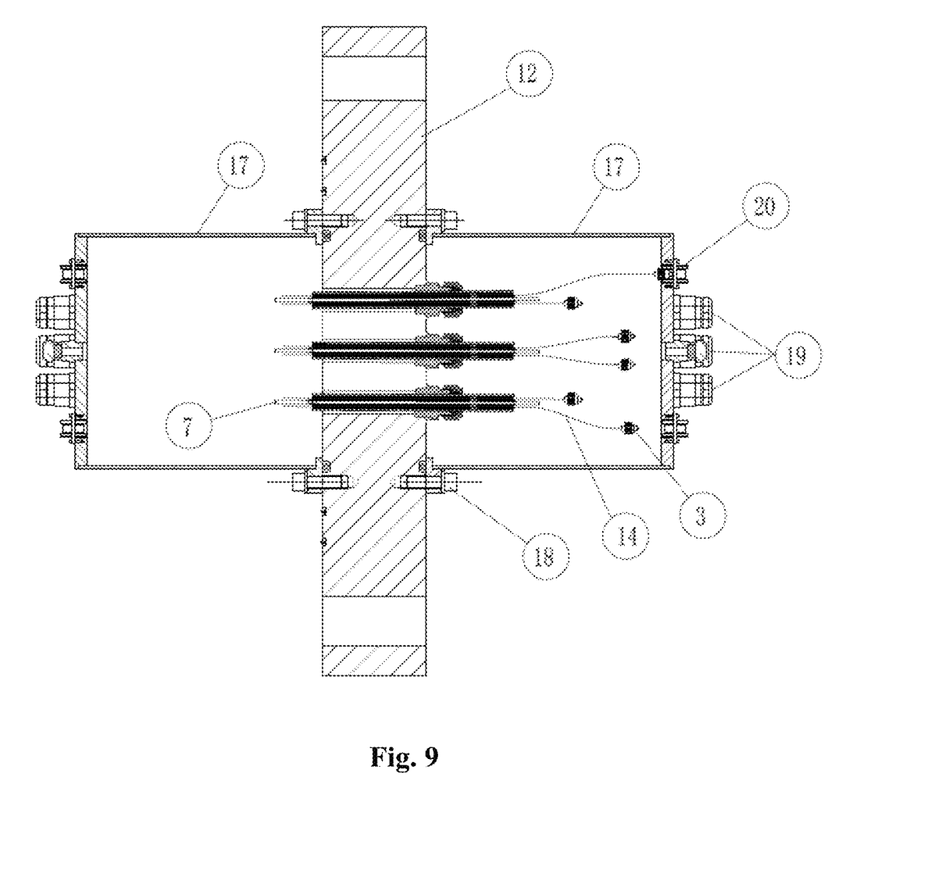
FIG. 9 is a schematic diagram of the assembly of an electrical penetration device according to Embodiment 3 of the present disclosure.

It should be noted that the above-mentioned electrical penetration device can be directly applied in engineering. Specifically, a junction box 17 can be provided on at least one side of the flange 12, with the junction box 17 covering the electrical penetration assembly. For example, as shown in FIG. 9, the junction boxes 17 are provided on both sides of the flange 12. Wherein a side of the junction box 17 facing away from the flange 12 is provided with at least one cable gland 19 and an FC adapter flange 20. In an embodiment, the number of FC adapter flanges 20 is the same as the number of optical fibers 14 on the flange 12, that is, the FC adapter flange 20 corresponds one to one with the optical fiber splice 3 on the electrical penetration assembly. The number of the cable glands 19 can be determined according to the type of cable. For example, when the cable is a single-core cable, the number of the cable glands 19 is the same as the number of the conductors on the flange 12, that is, each cable is connected to the corresponding conductor through a cable gland 19. When the cable is a multi-core cable, for example, the flange 12 is provided with 7 electrical penetration assemblies and a 7-core cable is selected, only one cable gland 19 is needed on the junction box 17 and the cable can be connected with the seven conductors on the flange 12 through the cable gland 19.

During installation: firstly, one end of the cable is threaded through the cable gland 19, and each core of the cable is connected to the corresponding conductor; then the optical fiber splice 3 on each electrical penetration assembly is connected to the corresponding FC adapter flange 20, so that the optical fiber splice 3 within the junction box 17 can be connected to the external optical signal demodulator through the FC adapter flange 20; then the junction box 17 is fixed to the flange 12 by the bolt 18; finally, the cable gland 19 is tightened to fix the cable on the junction box 17.

It can be seen that a junction box 17 for covering the electrical penetration assembly is provided on the flange 12, and a cable gland 19 for threading and fixing the cable as well as an FC adapter flange 20 for connecting the optical fiber splice 3 are arranged on the end face of the junction box 17, by way of which not only the waterproof and dustproof of the electrical penetration assembly can be enabled, but also a wiring channel for the optical fiber 14 and the cable of the electrical penetration assembly is provided.

It should be noted that the embodiments are only for illustrating the technical solutions of the present disclosure, rather than limiting them; although the present disclosure has been described in detail with reference to the foregoing embodiments, those skilled in the art should understand that the technical solutions documented in the preceding embodiments may still be modified, or parts of the technical features thereof can be equivalently substituted; and such modifications or substitutions do not deviate from scope of the technical solutions of the embodiments of the present disclosure.

The invention claimed is:

1. An electrical penetration assembly, comprising:
   sealing glass;
   an outer tube; and
   a conductor inserted into the outer tube, wherein
      both ends of the outer tube are blocked by supporting and fixing blocks, and both ends of the conductor respectively protrude from the corresponding supporting and fixing blocks;
      the sealing glass is sintered between the conductor and the outer tube and is configured to divide an annular cavity jointly enclosed by the conductor, the outer tube and the supporting and fixing blocks into an upper cavity and a lower cavity; and
      an optical fiber penetrates the sealing glass, at least one end of the optical fiber is connected to an optical fiber splice after protruding from the corresponding supporting and fixing block, and a portion of the optical fiber located in the sealing glass is inscribed with a fiber Bragg grating to form a first fiber Bragg grating sensor.

2. The electrical penetration assembly of claim 1, wherein both an upper portion and a lower portion of the outer tube are provided with vent holes transversely running therethrough.

3. The electrical penetration assembly of claim 1, wherein a plurality of the optical fibers penetrate the sealing glass.

4. The electrical penetration assembly of claim 1, wherein the conductor comprises a metal conductor and an insulating sleeve sleeved on an outer side of the metal conductor.

5. The electrical penetration assembly of claim 1, wherein the sealing glass is made of inorganic materials.

6. The electrical penetration assembly of claim 1, wherein a portion of the optical fiber proximate to the sealing glass is inscribed with a fiber Bragg grating to form a second fiber Bragg grating sensor.

7. The electrical penetration assembly of claim 6, wherein the second fiber Bragg grating sensor is provided in the optical fiber located on both upper and lower sides of the sealing glass.

8. An electrical penetration device, comprising:
   a flange;
   a locking nut;
   a holddown ferrule;
   a mounting sleeve; and
   at least one electrical penetration assembly wherein
      an inner wall of a top end of the mounting sleeve is provided with a sealing ring groove and an outer wall of a bottom end of the mounting sleeve is provided with an external thread;
      the flange is provided with a mounting through hole, an upper part of which has an internal thread matched with the external thread;
      an outer tube is inserted in the mounting sleeve;
      the holddown ferrule is sleeved on the outer tube, a bottom end of the holddown ferrule is inserted in the sealing ring groove, and a top end thereof protrudes from the mounting sleeve;
      the locking nut is threadedly connected with a top of the mounting sleeve and holds down the holddown ferrule, wherein the electrical assembly further comprises:
         a conductor inserted in the outer tube with a sealing glass sintered between the conductor and the outer tube; and
         an optical fiber penetrating the sealing glass with one end of the optical fiber being connected to an optical fiber splice and a portion of the optical fiber located in the sealing glass being inscribed with a fiber Bragg grating to form a first fiber Bragg grating sensor.

9. The electrical penetration device of claim 8, wherein both ends of the outer tube are blocked by supporting and fixing blocks, and both ends of the conductor respectively protrude from the corresponding supporting and fixing blocks; the sealing glass is sintered between the conductor and the outer tube and is configured to divide an annular cavity jointly enclosed by the conductor, the outer tube and the supporting and fixing blocks into an upper cavity and a lower cavity; wherein the optical fiber penetrates the sealing glass, at least one end of the optical fiber is connected to an optical fiber splice after protruding from the corresponding supporting and fixing block.

* * * * *